United States Patent
Tong et al.

(10) Patent No.: US 10,005,172 B2
(45) Date of Patent: Jun. 26, 2018

(54) CONTROLLED-POROSITY METHOD FOR FORMING POLISHING PAD

(71) Applicants: Rohm and Haas Electronic Materials CMP Holdings, Inc., Newark, DE (US); Dow Global Technologies LLC, Midland, MI (US)

(72) Inventors: Yuhua Tong, Hockessin, DE (US); Andrew Wank, Avondale, PA (US); Diego Lugo, Newark, DE (US); Marc R. Stack, Middleton, DE (US); David Michael Veneziale, Hatfield, PA (US); Marty W. DeGroot, Middleton, DE (US); George C. Jacob, Newark, DE (US); Jeffrey B. Miller, West Chester, PA (US)

(73) Assignees: Rohm and Haas Electronic Materials CMP Holdings, Inc., Newark, DE (US); Dow Global Technologies LLC, Midland, MI (US)

( * ) Notice: Subject to any disclaimer, the term of this patent is extended or adjusted under 35 U.S.C. 154(b) by 369 days.

(21) Appl. No.: 14/751,328

(22) Filed: Jun. 26, 2015

(65) Prior Publication Data

US 2016/0375550 A1    Dec. 29, 2016

(51) Int. Cl.
*B24D 11/00* (2006.01)
*B29C 41/12* (2006.01)
*B29L 31/00* (2006.01)

(52) U.S. Cl.
CPC ............ *B24D 11/001* (2013.01); *B29C 41/12* (2013.01); *B29L 2031/736* (2013.01)

(58) Field of Classification Search
None
See application file for complete search history.

(56) References Cited

U.S. PATENT DOCUMENTS

| | | | |
|---|---|---|---|
| 3,677,681 A | 7/1972 | Zippel et al. |
| 3,705,821 A | 12/1972 | Breer et al. |
| 3,954,544 A | 5/1976 | Hooker |
| 4,053,283 A | 10/1977 | Schneider et al. |
| 4,144,295 A | 3/1979 | Dever, Jr. |

(Continued)

FOREIGN PATENT DOCUMENTS

JP    2001172732    12/2002

OTHER PUBLICATIONS

Copending U.S. Appl. No. 14/751,340.
(Continued)

*Primary Examiner* — Joseph A Miller, Jr.
(74) *Attorney, Agent, or Firm* — Blake T. Biederman

(57) ABSTRACT

The invention is to a method of manufacturing a polishing pad suitable for planarizing at least one of semiconductor, optical and magnetic substrates. The method includes applying droplets of a liquid polymer against a substrate to form a plurality of pores. The liquid polymer contains a nonionic surfactant, the nonionic surfactant has a concentration sufficient to facilitate growth of pores within the liquid polymer and an ionic surfactant has a concentration sufficient to limit growth of the pores within the liquid polymer. Curing the solid polymer forms a polishing pad with final size of the plurality of pores controlled by the concentration of nonionic surfactant and ionic surfactants.

8 Claims, 15 Drawing Sheets

(56) References Cited

U.S. PATENT DOCUMENTS

| | | |
|---|---|---|
| 5,163,584 A | 11/1992 | Huber et al. |
| 7,670,517 B2 | 3/2010 | Tadokoro et al. |
| 8,314,029 B2 | 11/2012 | Hirose et al. |
| 2001/0046834 A1* | 11/2001 | Ramana .................. B24B 37/24 451/526 |
| 2006/0052040 A1* | 3/2006 | Prasad .................... B24B 37/24 451/41 |
| 2007/0128372 A1 | 6/2007 | Wirth et al. |
| 2009/0094900 A1 | 4/2009 | Swisher et al. |
| 2012/0064326 A1* | 3/2012 | Kim .................... C09D 175/04 428/220 |
| 2013/0012108 A1* | 1/2013 | Li ......................... B24D 3/344 451/59 |

OTHER PUBLICATIONS

Copending U.S. Appl. No. 14/751,350.
Copending U.S. Appl. No. 14/751,364.
Copending U.S. Appl. No. 14/751,385.
Copending U.S. Appl. No. 14/751,410.
Copending U.S. Appl. No. 14/751,423.

* cited by examiner

CONTROLLED-POROSITY METHOD FOR FORMING POLISHING PAD

BACKGROUND

The present invention relates to a method of forming chemical mechanical polishing pads. More particularly, the present invention relates to a method of forming chemical mechanical polishing pads using surfactants.

In the fabrication of integrated circuits and other electronic devices, multiple layers of conducting, semiconducting and dielectric materials are deposited onto and removed from a surface of a semiconductor wafer. Thin layers of conducting, semiconducting and dielectric materials may be deposited using a number of deposition techniques. Common deposition techniques in modern wafer processing include physical vapor deposition (PVD), also known as sputtering, chemical vapor deposition (CVD), plasma-enhanced chemical vapor deposition (PECVD) and electrochemical plating, among others. Common removal techniques include wet and dry isotropic and anisotropic etching, among others.

As layers of materials are sequentially deposited and removed, the uppermost surface of the wafer becomes non-planar. Because subsequent semiconductor processing (e.g., metallization) requires the wafer to have a flat surface, the wafer needs to be planarized. Planarization is useful for removing undesired surface topography and surface defects, such as rough surfaces, agglomerated materials, crystal lattice damage, scratches and contaminated layers or materials.

Chemical mechanical planarization, or chemical mechanical polishing (CMP), is a common technique used to planarize or polish work pieces such as semiconductor wafers. In conventional CMP, a wafer carrier, or polishing head, is mounted on a carrier assembly. The polishing head holds the wafer and positions the wafer in contact with a polishing layer of a polishing pad that is mounted on a table or platen within a CMP apparatus. The carrier assembly provides a controllable pressure between the wafer and polishing pad. Simultaneously, a polishing medium (e.g., slurry) is dispensed onto the polishing pad and is drawn into the gap between the wafer and polishing layer. To effect polishing, the polishing pad and wafer typically rotate relative to one another. As the polishing pad rotates beneath the wafer, the wafer sweeps out a typically annular polishing track, or polishing region, wherein the wafer's surface directly confronts the polishing layer. The wafer surface is polished and made planar by chemical and mechanical action of the polishing layer and polishing medium on the surface.

Hirose et al. disclose a method of making polishing layers in U.S. Pat. No. 8,314,029. Specifically, Hirose et al. disclose a method for manufacturing a polishing pad containing substantially spherical cells and having high thickness accuracy, which includes preparing a cell dispersed urethane composition by a mechanical foaming method; continuously discharging the cell dispersed urethane composition from a single discharge port to a substantially central portion in the width direction of a face material A, while feeding the face material A; laminating a face material B on the cell dispersed urethane composition; then uniformly adjusting the thickness of the cell dispersed urethane composition by thickness adjusting means; curing the cell dispersed urethane composition with the thickness adjusted in the preceding step without applying any additional load to the composition so that a polishing sheet including a polyurethane foam is formed; and cutting the polishing sheet. This process can have difficulty in controlling pore size and pore size distribution. Also, the complicated process can create fouling issues that can decrease manufacturing efficacy.

Notwithstanding, there is a continuing need for improved methods of manufacturing polishing layers for chemical mechanical polishing pads having better control of pore size and pore size distribution. Particularly for methods that reduce the total number of process steps required and improve quality of the completed polishing pad. Hence, what is needed is an improved method of providing a polishing layer for a chemical mechanical polishing pad, having enhanced polishing performance and manufacturability.

STATEMENT OF INVENTION

An aspect of the invention provides a method of manufacturing a polishing pad suitable for planarizing at least one of semiconductor, optical and magnetic substrates, the method comprising the following: applying droplets of a liquid polymer against a substrate to form a plurality of pores in the liquid polymer, the liquid polymer containing a nonionic surfactant, the nonionic surfactant having a concentration sufficient to facilitate growth of pores within the liquid polymer and an ionic surfactant having a concentration sufficient to limit growth of the pores within the liquid polymer; solidifying the droplets of liquid polymer against the substrate into a solid polymer containing a plurality of pores; repeating the applying of droplets and the solidifying of the droplets of liquid polymer multiple times to increase thickness of the solid substrate; and curing the solid polymer into a polishing pad with final size of the plurality of pores controlled by the concentration of nonionic surfactant and ionic surfactant.

An additional aspect of the invention provides a method of manufacturing a polishing pad suitable for planarizing at least one of semiconductor, optical and magnetic substrates, the method comprising the following: applying droplets of a liquid polymer against a substrate to form a plurality of pores in the liquid polymer, the liquid polymer containing a nonionic surfactant, the nonionic surfactant having a concentration sufficient to facilitate growth of pores within the liquid polymer and an ionic surfactant having a concentration sufficient to limit growth of the pores within the liquid polymer; connecting adjacent pores to form a network of interconnected pores in the liquid polymer; solidifying the droplets of liquid polymer against the substrate into a solid polymer containing a plurality of pores; repeating the applying of droplets, connecting adjacent pores and the solidifying of the droplets of liquid polymer multiple times to increase thickness of the solid substrate; and curing the solid polymer into a polishing pad with final size of the plurality of pores controlled by the concentration of nonionic surfactant and ionic surfactant.

DETAILED DESCRIPTION

Various conventional processes for forming chemical mechanical polishing layers, such as, casting processes (i.e., forming cakes to be skived into multiple polishing layers) and frothing processes require sufficiently long gel times to facilitate the processing. Both frothing and casting processes require machining of the final groove pattern into the surface of the polishing layers formed. The method of the present invention greatly enhances the quality of the groove pattern formed in the polishing surface of the polishing layer and eliminates the need for machining the groove pattern into the finished polishing layer as is required by many conventional polishing layer manufacturing methods. The method of the present invention also enables a broader compositional window than would be suitable for conventional polishing layer manufacturing processes given the inherent limitations in the conventional techniques (i.e., gel time constraints).

Figure 1:
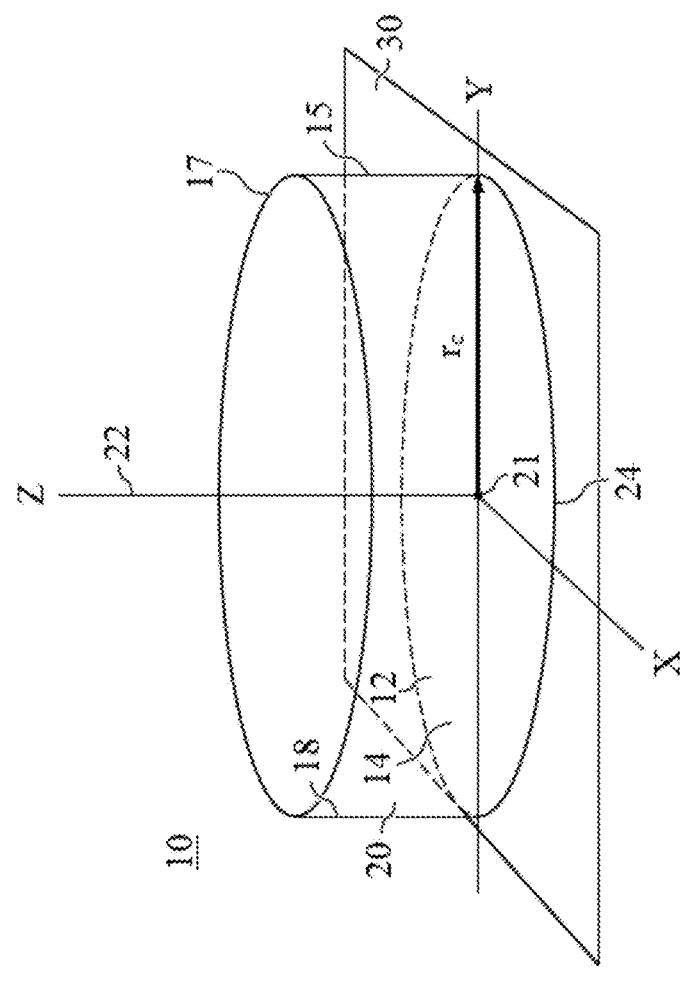
FIG. 1 is a depiction of a perspective view of a mold for use in the method of the present invention.

The term "substantially circular cross section" as used herein and in the appended claims in reference to a mold cavity (20) means that the longest radius, $r_c$, of the mold cavity (20) projected onto the x-y plane (30) from the mold cavity's central axis, $C_{axis}$, (22) to a vertical internal boundary (18) of a surrounding wall (15) is ≤20% longer than the shortest radius, $r_c$, of the mold cavity (20) projected onto the x-y plane (30) from the mold cavity's central axis, $C_{axis}$, (22) to the vertical internal boundary (18). (See FIG. 1).

Figure 4:
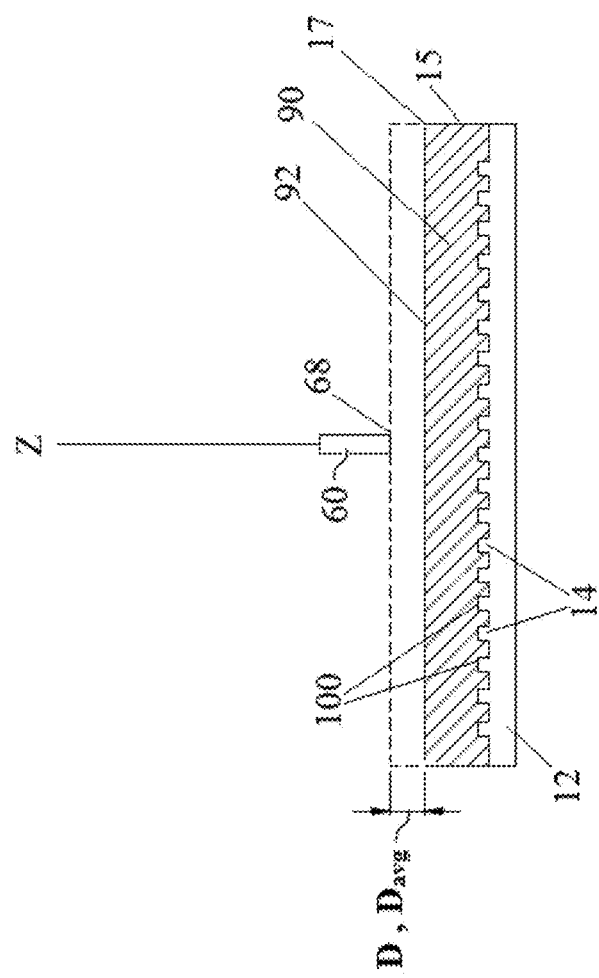
FIG. 4 is a depiction of a side elevational view of a chemical mechanical polishing pad polishing layer formed in a mold of the present invention.

The term "mold cavity" as used herein and in the appended claims refers to the volume defined by a base (12) and a vertical internal boundary (18) of a surrounding wall (15). (See FIGS. 1 and 4).

The term "substantially perpendicular" as used herein and in the appended claims in reference to a first feature (e.g., a horizontal internal boundary; a vertical internal boundary) relative to a second feature (e.g., an axis, an x-y plane) means that the first feature is at an angle of 80 to 100° to the second feature.

The term "essentially perpendicular" as used herein and in the appended claims in reference to a first feature (e.g., a horizontal internal boundary; a vertical internal boundary) relative to a second feature (e.g., an axis, an x-y plane) means that the first feature is at an angle of 85 to 95° to the second feature.

Figure 5:
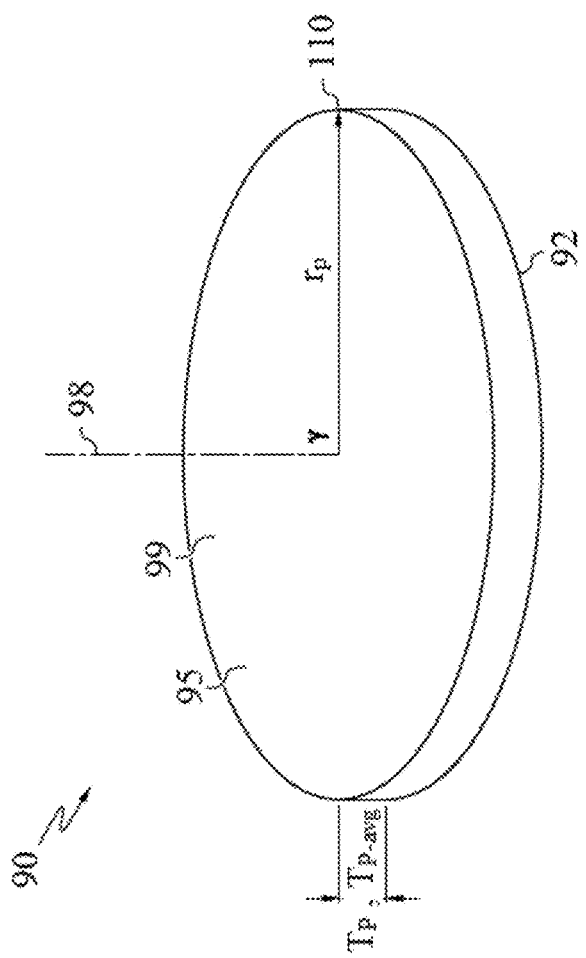
FIG. 5 is a depiction of a perspective view of a chemical mechanical polishing pad polishing layer of the present invention.

The term "average thickness, $T_{P\text{-}avg}$" as used herein and in the appended claims in reference to a chemical mechanical polishing pad polishing layer (90) having a polishing surface (95) means the average thickness, $T_P$, of the chemical mechanical polishing pad polishing layer in a direction normal to the polishing surface (95) from the polishing surface (95) to the bottom surface (92) of the chemical mechanical polishing pad polishing layer (90). (See FIG. 5).

The term "substantially circular cross section" as used herein and in the appended claims in reference to a chemical mechanical polishing pad polishing layer (90) means that the longest radius, $r_p$, of the cross section from the central axis (98) of the chemical mechanical polishing pad polishing layer (90) to the outer perimeter (110) of the polishing surface (95) of the chemical mechanical polishing pad polishing layer (90) is ≤20% longer than the shortest radius, $r_p$, of the cross section from the central axis (98) to the outer perimeter (110) of the polishing surface (95). (See FIG. 5).

The chemical mechanical polishing pad polishing layer (90) of the present invention is preferably adapted for rotation about a central axis (98). (See FIG. 5). Preferably, the polishing surface (95) of the chemical mechanical polishing pad polishing layer (90) is in a plane (99) perpendicular to the central axis (98). Preferably, the chemical mechanical polishing pad polishing layer (90) is adapted for rotation in a plane (99) that is at an angle, γ, of 85 to 95° to the central axis (98), preferably, of 90° to the central axis (98). Preferably, the chemical mechanical polishing pad polishing layer (90) has a polishing surface (95) that has a substantially circular cross section perpendicular to the central axis (98). Preferably, the radius, $r_p$, of the cross section of the polishing surface (95) perpendicular to the central axis (98) varies by ≤20% for the cross section, more preferably by ≤10% for the cross section.

The term "gel time" as used herein and in the appended claims in reference to a combination of a poly side (P) liquid component and an iso side (I) liquid component formed in an axial mixing device of the present invention, means the total cure time for that combination determined using a standard test method according to ASTM D3795-00a (Reapproved 2006) (*Standard Test Method for Thermal Flow, Cure, and Behavior Properties of Pourable Thermosetting Materials by Torque Rheometer*).

The term "poly(urethane)" as used herein and in the appended claims encompasses (a) polyurethanes formed from the reaction of (i) isocyanates and (ii) polyols (including diols); and, (b) poly(urethane) formed from the reaction of (i) isocyanates with (ii) polyols (including diols) and (iii) water, amines or a combination of water and amines.

Preferably, the method of forming a chemical mechanical polishing pad polishing layer of the present invention, comprises: providing a mold (10) having a base (12), wherein the base (12) of the mold (10) has a negative (14) of a groove pattern (100) formed therein; providing a poly side (P) liquid component, comprising at least one of a (P) side polyol, a (P) side polyamine and a (P) side amino alcohol; providing an iso side (I) liquid component, comprising at least one multi-functional isocyanate; providing a pressurized gas; providing an axial mixing device (60) having an internal cylindrical chamber (65); wherein the internal cylindrical chamber (65) has a closed end (62), an open end (68), an axis of symmetry (70), at least one (P) side liquid feed port (75) that opens into the internal cylindrical chamber (65), at least one (I) side liquid feed port (80) that opens into the internal cylindrical chamber (65), and at least one (preferably, at least two) tangential pressurized gas feed port (85) that opens into the internal cylindrical chamber (65); wherein the closed end (62) and the open end (68) are perpendicular to the axis of symmetry (70) of the internal cylindrical chamber (65); wherein the at least one (P) side liquid feed port (75) and the at least one (I) side liquid feed port (80) are arranged along a circumference (67) of the internal cylindrical chamber (65) proximate the closed end (62); wherein the at least one (preferably, at least two) tangential pressurized gas feed port (85) is arranged along the circumference (67) of the internal cylindrical chamber (65) downstream of the at least one (P) side liquid feed port (75) and the at least one (I) side liquid feed port (80) from the closed end (62); wherein the poly side (P) liquid component is introduced into the internal cylindrical chamber (65) through the at least one (P) side liquid feed port (75) at a (P) side charge pressure of 6,895 to 27,600 kPa; wherein the iso side (I) liquid component is introduced into the internal cylindrical chamber (65) through the at least one (I) side liquid feed port (80) at an (I) side charge pressure of 6,895 to 27,600 kPa; wherein a combined mass flow rate of the poly side (P) liquid component and the iso side (I) liquid component to the internal cylindrical chamber (65) is 6 to 500 g/s (preferably, 6 to 250 g/s; more preferably, 6 to 100 g/s; most preferably, 6 to 25 g/s); wherein the poly side (P) liquid component, the iso side (I) liquid component and the pressurized gas are intermixed within the internal cylindrical chamber (65) to form a combination; wherein the pressurized gas is introduced into the internal cylindrical chamber (65) through the at least one (preferably, at least two) tangential pressurized gas feed port (85) with a supply pressure of 150 to 1,500 kPa; wherein an inlet velocity into the internal cylindrical chamber (65) of the pressurized gas is 90 to 600 m/s; discharging the combination from the open end (68) of the internal cylindrical chamber (65) toward the base (12) of the mold (10) at a velocity of 10 to 300 m/sec; allowing the combination to solidify into a cake; separating the cake from the mold (10); and, deriving the chemical mechanical polishing pad polishing layer (90) from the cake, wherein the chemical mechanical polishing pad polishing layer (90) has a polishing surface (95) with the groove pattern (100) formed into the polishing surface (95), and wherein the polishing surface (95) is adapted for polishing a substrate.

Preferably, the base (12) of the mold (10) used in the method of the present invention defines a negative (14) of a groove pattern; wherein the groove pattern (100) is transferred to the polishing surface (95) of the chemical mechanical polishing pad polishing layer (90). Preferably, the base (12) of the mold (10) has a substantially circular cross section having an average radius, $r_c$, (preferably, wherein $r_c$ is 20 to 100 cm; more preferably, wherein $r_c$ is 25 to 65 cm; most preferably, wherein $r_c$ is 40 to 60 cm). (See FIGS. 1 and 4).

Preferably, the mold (10) used in the method of the present invention can have a surrounding wall (15). Preferably, the surrounding wall defines a vertical internal boundary (18) of the mold cavity (20) that is substantially perpendicular to the x-y plane (30). More preferably, the surrounding wall defines a vertical internal boundary (18) of the mold cavity (20) that is essentially perpendicular to the x-y plane (30). (See FIGS. 1 and 4).

Preferably, the mold cavity (20) has a central axis, $C_{axis}$, (22) that coincides with the z-axis and that intersects the horizontal internal boundary (14) of the base (12) of the mold (10) at a center point (21). Preferably, the center point (21) is located at the geometric center of the cross section, $C_{x-sect}$, (24) of the mold cavity (20) projected onto the x-y plane (30). (See FIG. 1).

Preferably, the mold cavity's cross section, $C_{x-sect}$, (24) projected onto the x-y plane (30) can be any regular or irregular two dimensional shape. Preferably, the mold cavity's cross section, $C_{x-sect}$, (24) is selected from a polygon and an ellipse. More preferably, the mold cavity's cross section, $C_{x-sect}$, (24) is a substantially circular cross section having an average radius, $r_c$, (preferably, wherein $r_c$ is 20 to 100 cm; more preferably, wherein $r_c$ is 25 to 65 cm; most preferably, wherein $r_c$ is 40 to 60 cm). Most preferably, the mold cavity (20) approximates a right cylindrically shaped region having a substantially circular cross section, $C_{x-sect}$; wherein the mold cavity has an axis of symmetry, $C_{x-sym}$, (25) which coincides with the mold cavity's central axis, $C_{axis}$, (22); wherein the right cylindrically shaped region has a cross sectional area, $C_{x-area}$, defined as follows:

$$C_{x-area} = \pi r_c^2,$$

wherein $r_c$ is the average radius of the mold cavity's cross sectional area, $C_{x-area}$, projected onto the x-y plane (30); and wherein $r_c$ is 20 to 100 cm (more preferably, 25 to 65 cm; most preferably, 40 to 60 cm). (See FIGS. 1 and 4).

Figure 2:
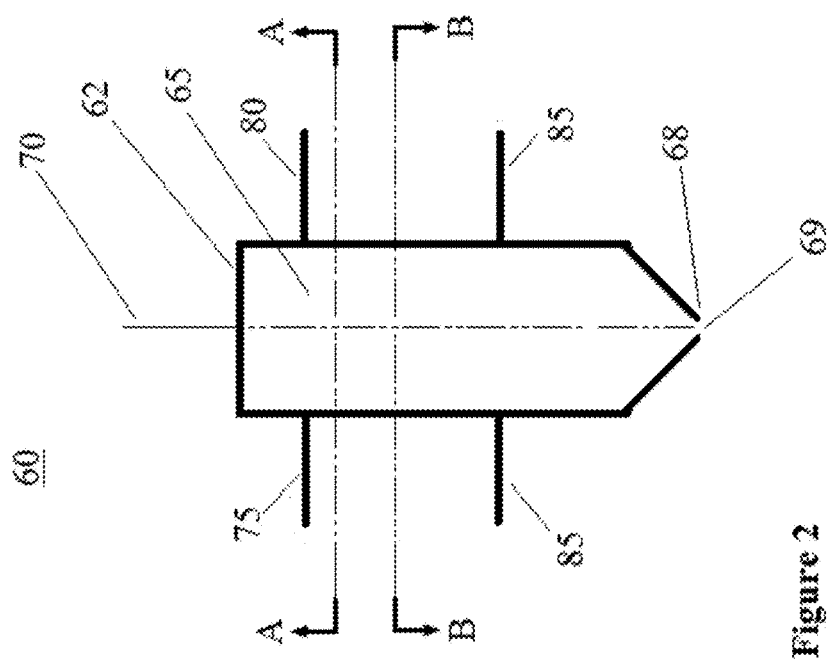
FIG. 2 is a depiction of a side elevational view of an axial mixing device for use in the method of the present invention.
Figure 3:
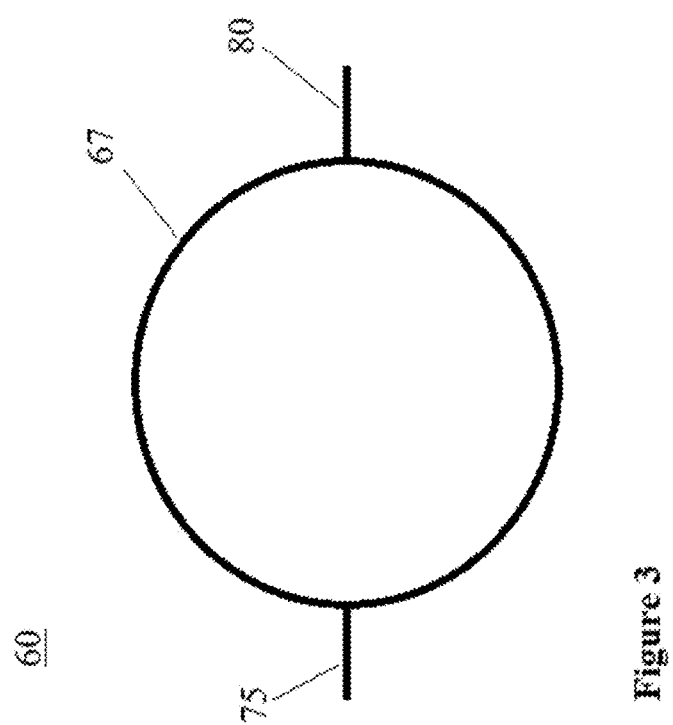
FIG. 3 is a cross sectional view taken along line A-A in FIG. 2.
Figure 11:
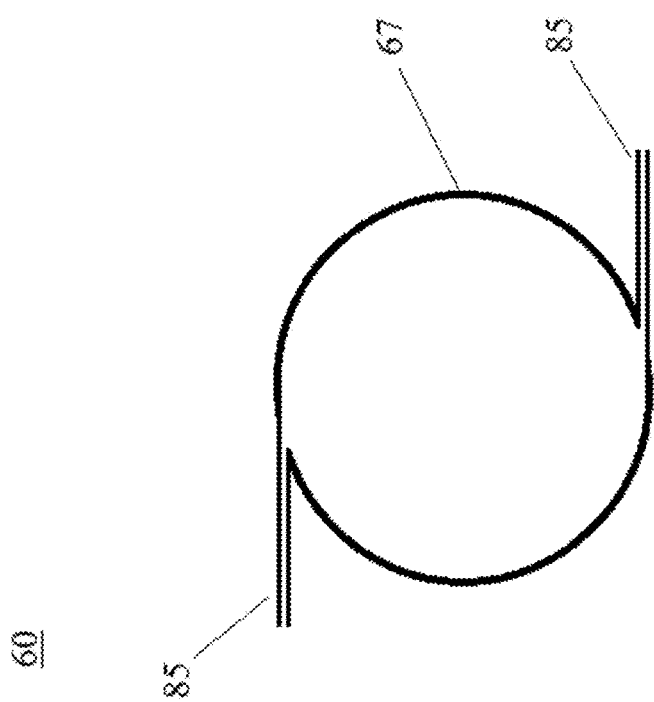
FIG. 11 is a cross sectional view taken along line B-B in FIG. 2.

Preferably, the axial mixing device (60) used in the method of the present invention has an internal cylindrical chamber (65). Preferably, the internal cylindrical chamber (65) has a closed end (62) and an open end (68). Preferably, the closed end (62) and the open end (68) are each substantially perpendicular to an axis of symmetry (70) of the internal cylindrical chamber (65). More preferably, the closed end (62) and the open end (68) are each essentially perpendicular to an axis of symmetry (70) of the internal cylindrical chamber (65). Most preferably, the closed end (62) and the open end (68) are each perpendicular to an axis of symmetry (70) of the internal cylindrical chamber (65). (See FIGS. 2-3 and 11).

Preferably, the axial mixing device (60) used in the method of the present invention has an internal cylindrical chamber (65) with an axis of symmetry (70), wherein the open end (68) has a circular opening (69). More preferably, the axial mixing device (60) used in the method of the present invention has an internal cylindrical chamber (65) with an axis of symmetry (70); wherein the open end (68) has a circular opening (69); and, wherein the circular opening (69) is concentric with the internal cylindrical chamber (65). Most preferably, the axial mixing device (60) used in the method of the present invention has an internal cylindrical chamber (65) with an axis of symmetry (70); wherein the open end (68) has a circular opening (69); wherein the circular opening (69) is concentric with the internal cylindrical chamber (65); and, wherein the circular opening (69) is perpendicular to the axis of symmetry (70) of the internal cylindrical chamber (65). Preferably, the circular opening (69) has a diameter of 1 to 10 mm (more preferably, 1.5 to 7.5 mm; still more preferably 2 to 6 mm; most preferably, 2.5 to 3.5 mm). (See FIGS. 2-3 and 11).

Preferably, the axial mixing device (60) used in the method of the present invention has at least one (P) side liquid feed port (75) that opens into the internal cylindrical chamber (65). More preferably, the axial mixing device (60)

used in the method of the present invention has at least two (P) side liquid feed ports (75) that open into the internal cylindrical chamber (65). Preferably, when the axial mixing device (60) used in the method of the present invention has at least two (P) side liquid feed ports (75) that open into the internal cylindrical chamber (65), the at least two (P) side liquid feed ports (75) are arranged evenly about a circumference (67) of the internal cylindrical chamber (65). More preferably, when the axial mixing device (60) used in the method of the present invention has at least two (P) side liquid feed ports (75) that open into the internal cylindrical chamber (65), the at least two (P) side liquid feed ports (75) are arranged evenly about a circumference (67) of the internal cylindrical chamber (65) and are at an equal distance from the closed end (62) of the internal cylindrical chamber (65). Preferably, the at least one (P) side liquid feed port opens into the internal cylindrical chamber (65) through an orifice having an inner diameter of 0.05 to 3 mm (preferably, 0.1 to 0.1 mm; more preferably, 0.15 to 0.5 mm). Preferably, the at least one (P) side liquid feed port opens into the internal cylindrical chamber (65) and is directed toward the axis of symmetry (70) of the internal cylindrical chamber (65). More preferably, the at least one (P) side liquid feed port opens into the internal cylindrical chamber (65) and is directed toward and essentially perpendicular to the axis of symmetry (70) of the internal cylindrical chamber (65). Most preferably, the at least one (P) side liquid feed port opens into the internal cylindrical chamber (65) and is directed toward and perpendicular to the axis of symmetry (70) of the internal cylindrical chamber (65).

Preferably, the axial mixing device (60) used in the method of the present invention has at least one (I) side liquid feed port (80) that opens into the internal cylindrical chamber (65). More preferably, the axial mixing device (60) used in the method of the present invention has at least two (I) side liquid feed ports (80) that open into the internal cylindrical chamber (65). Preferably, when the axial mixing device (60) used in the method of the present invention has at least two (I) side liquid feed ports (80) that open into the internal cylindrical chamber (65), the at least two (I) side liquid feed ports (80) are arranged evenly about a circumference (67) of the internal cylindrical chamber (65). More preferably, when the axial mixing device (60) used in the method of the present invention has at least two (I) side liquid feed ports (80) that open into the internal cylindrical chamber (65), the at least two (I) side liquid feed ports (80) are arranged evenly about a circumference (67) of the internal cylindrical chamber (65) and are at an equal distance from the closed end (62) of the internal cylindrical chamber (65). Preferably, the at least one (I) side liquid feed port opens into the internal cylindrical chamber (65) through an orifice having an inner diameter of 0.05 to 3 mm (preferably, 0.1 to 0.1 mm; more preferably, 0.15 to 0.5 mm). Preferably, the at least one (I) side liquid feed port opens into the internal cylindrical chamber (65) through an orifice having an inner diameter of 0.05 to 1 mm (preferably, 0.1 to 0.75 mm; more preferably, 0.15 to 0.5 mm). Preferably, the at least one (I) side liquid feed port opens into the internal cylindrical chamber (65) and is directed toward the axis of symmetry (70) of the internal cylindrical chamber (65). More preferably, the at least one (I) side liquid feed port opens into the internal cylindrical chamber (65) and is directed toward and essentially perpendicular to the axis of symmetry (70) of the internal cylindrical chamber (65). Most preferably, the at least one (I) side liquid feed port opens into the internal cylindrical chamber (65) and is directed toward and perpendicular to the axis of symmetry (70) of the internal cylindrical chamber (65).

Preferably, the axial mixing device (60) used in the method of the present invention has at least one (P) side liquid feed port (75) that opens into the internal cylindrical chamber (65) and at least one (I) side liquid feed port (80) that opens into the internal cylindrical chamber (65); wherein the at least one (P) side liquid feed port (75) and the at least one (I) side liquid feed port (80) are arranged evenly about the circumference (67) of the internal cylindrical chamber (65). More preferably, the axial mixing device (60) used in the method of the present invention has at least one (P) side liquid feed port (75) that opens into the internal cylindrical chamber (65) and at least one (I) side liquid feed port (80) that opens into the internal cylindrical chamber (65); wherein the at least one (P) side liquid feed port (75) and the at least one (I) side liquid feed port (80) are arranged evenly about a circumference (67) of the internal cylindrical chamber (65) and are at an equal distance from the closed end (62) of the internal cylindrical chamber (65).

Preferably, the axial mixing device (60) used in the method of the present invention has at least two (P) side liquid feed ports (75) that open into the internal cylindrical chamber (65) and at least two (I) side liquid feed ports (80) that open into the internal cylindrical chamber (65). Preferably, when the axial mixing device (60) used in the method of the present invention has at least two (P) side liquid feed ports (75) that open into the internal cylindrical chamber (65) and at least two (I) side liquid feed ports (80) that open into the internal cylindrical chamber (65), the at least two (P) side liquid feed ports (75) are arranged evenly about the circumference (67) of the internal cylindrical chamber (65) and the at least two (I) side liquid feed ports (80) are arranged evenly about the circumference (67) of the internal cylindrical chamber (65). Preferably, when the axial mixing device (60) used in the method of the present invention has at least two (P) side liquid feed ports (75) that open into the internal cylindrical chamber (65) and at least two (I) side liquid feed ports (80) that open into the internal cylindrical chamber (65), the (P) side liquid feed ports (75) and the (I) side liquid feed ports (80) alternate about the circumference (67) of the internal cylindrical chamber (65). More preferably, when the axial mixing device (60) used in the method of the present invention has at least two (P) side liquid feed ports (75) that open into the internal cylindrical chamber (65) and at least two (I) side liquid feed ports (80) that open into the internal cylindrical chamber (65), the (P) side liquid feed ports (75) and the (I) side liquid feed ports (80) alternate and are evenly spaced about the circumference (67) of the internal cylindrical chamber (65). Most preferably, when the axial mixing device (60) used in the method of the present invention has at least two (P) side liquid feed ports (75) that open into the internal cylindrical chamber (65) and at least two (I) side liquid feed ports (80) that open into the internal cylindrical chamber (65); the (P) side liquid feed ports (75) and the (I) side liquid feed ports (80) alternate and are evenly spaced about the circumference (67) of the internal cylindrical chamber (65); and, the (P) side liquid feed ports (75) and the (I) side liquid feed ports (80) are all at an equal distance from the closed end (62) of the internal cylindrical chamber (65).

Preferably, the axial mixing device (60) used in the method of the present invention has at least one tangential pressurized gas feed port (85) that opens into the internal cylindrical chamber (65). More preferably, the axial mixing device (60) used in the method of the present invention has at least one tangential pressurized gas feed port (85) that opens into the internal cylindrical chamber (65); wherein the at least one tangential pressurized gas feed port (85) is arranged along the circumference of the internal cylindrical chamber (65) downstream of the at least one (P) side liquid feed port (75) and the at least one (I) side liquid feed port (80) from the closed end (62). Still more preferably, the axial mixing device (60) used in the method of the present invention has at least two tangential pressurized gas feed ports (85) that open into the internal cylindrical chamber (65); wherein the at least two tangential pressurized gas feed ports (85) are arranged along the circumference of the internal cylindrical chamber (65) downstream of the at least one (P) side liquid feed port (75) and the at least one (I) side liquid feed port (80) from the closed end (62). Yet still more preferably, the axial mixing device (60) used in the method of the present invention has at least two tangential pressurized gas feed ports (85) that open into the internal cylindrical chamber (65); wherein the at least two tangential pressurized gas feed ports (85) are arranged along the circumference of the internal cylindrical chamber (65) downstream of the at least one (P) side liquid feed port (75) and the at least one (I) side liquid feed port (80) from the closed end (62); and, wherein the at least two tangential pressurized gas feed ports (85) are arranged evenly about a circumference (67) of the internal cylindrical chamber (65). Most preferably, the axial mixing device (60) used in the method of the present invention has at least two tangential pressurized gas feed ports (85) that open into the internal cylindrical chamber (65); wherein the at least two tangential pressurized gas feed ports (85) are arranged along the circumference of the internal cylindrical chamber (65) downstream of the at least one (P) side liquid feed port (75) and the at least one (I) side liquid feed port (80) from the closed end (62); and, wherein the at least two tangential pressurized gas feed ports (85) are arranged evenly about a circumference (67) of the internal cylindrical chamber (65) and are at an equal distance from the closed end (62) of the internal cylindrical chamber (65). Preferably, the at least one tangential pressurized gas feed port opens into the internal cylindrical chamber (65) through an orifice having a critical dimension of 0.1 to 5 mm (preferably, 0.3 to 3 mm; more preferably, 0.5 to 2 mm). Preferably, the at least one tangential pressurized gas feed port opens into the internal cylindrical chamber (65) and is directed tangentially along an internal circumference of the internal cylindrical chamber (65). More preferably, the at least one tangential pressurized gas feed port opens into the internal cylindrical chamber (65) and is directed tangentially along an internal circumference of the internal cylindrical chamber and on a plane that is essentially perpendicular to the axis of symmetry (70) of the internal cylindrical chamber (65). Most preferably, the at least one tangential pressurized gas feed port opens into the internal cylindrical chamber (65) and is directed tangentially along an internal circumference of the internal cylindrical chamber and on a plane that is perpendicular to the axis of symmetry (70) of the internal cylindrical chamber (65).

Preferably, in the method of the present invention, the poly side (P) liquid component, comprises at least one of a (P) side polyol, a (P) side amino compound as curatives or chain extenders, the compounds having both amino and hydroxyl functional groups are also included.

Preferably, the (P) side polyol is selected from the group consisting of diols, triols, multifunctional polyols, copolymers thereof and mixtures thereof. More preferably, the (P) side polyol is selected from the group consisting of polyether polyols (e.g., poly(oxytetramethylene)glycol, poly (oxypropylene)glycol and mixtures thereof); polycarbonate polyols; polyester polyols; mixtures thereof; and, mixtures thereof with one or more low molecular weight polyols selected from the group consisting of ethylene glycol; 1,2-propylene glycol; 1,3-propylene glycol; 1,2-butanediol; 1,3-butanediol; 2-methyl-1,3-propanediol; 1,4-butanediol; neopentyl glycol; 1,5-pentanediol; 3-methyl-1,5-pentanediol; 1,6-hexanediol; diethylene glycol; dipropylene glycol; and, tripropylene glycol. Still more preferably, the at least one (P) side polyol is selected from the group consisting of polytetramethylene ether glycol (PTMEG); ester based polyols (such as poly(ethylene adipate), poly(butylene adipate) polyols); polypropylene ether glycols (PPG); polycaprolactone polyols; polycarbonate polyols, copolymers thereof; and, mixtures thereof.

Preferably, in the method of the present invention, the poly side (P) liquid component used contains at least one (P) side polyol; wherein the at least one (P) side polyol includes a high molecular weight polyol having a number average molecular weight, $M_N$, of 2,500 to 100,000. More preferably, the high molecular weight polyol used has a number average molecular weight, $M_N$, of 5,000 to 50,000 (still more preferably 7,500 to 25,000; most preferably 10,000 to 12,000).

Preferably, in the method of the present invention, the poly side (P) liquid component used contains at least one (P) side polyol; wherein the at least one (P) side polyol includes a high molecular weight polyol having an average of three to ten hydroxyl groups per molecule. More preferably, the high molecular weight polyol used has an average of four to eight (still more preferably five to seven; most preferably six) hydroxyl groups per molecule.

Examples of commercially available high molecular weight polyols include Specflex® polyols, Voranol® polyols and Voralux® polyols (available from The Dow Chemical Company); Multranol® Specialty Polyols and Ultracel® Flexible Polyols (available from Bayer MaterialScience LLC); and Pluracol® Polyols (available from BASF). A number of preferred high molecular weight polyols are listed in TABLE 1.

TABLE 1

| High molecular weight polyol | Number of OH groups per molecule | $M_N$ | Hydroxyl Number (mg KOH/g) |
|---|---|---|---|
| Multranol ® 3901 Polyol | 3.0 | 6,000 | 28 |
| Pluracol ® 1385 Polyol | 3.0 | 3,200 | 50 |
| Pluracol ® 380 Polyol | 3.0 | 6,500 | 25 |
| Pluracol ® 1123 Polyol | 3.0 | 7,000 | 24 |
| ULTRACEL ® 3000 Polyol | 4.0 | 7,500 | 30 |
| SPECFLEX ® NC630 Polyol | 4.2 | 7,602 | 31 |
| SPECFLEX ® NC632 Polyol | 4.7 | 8,225 | 32 |
| VORALUX ® HF 505 Polyol | 6.0 | 11,400 | 30 |
| MULTRANOL ® 9185 Polyol | 6.0 | 3,366 | 100 |
| VORANOL ® 4053 Polyol | 6.9 | 12,420 | 31 |

Preferably, the (P) side amino compound is selected from the group consisting of diamines and other multifunctional amines More preferably, the (P) side amino compound is selected from the group consisting of aromatic diamines and other multifunctional aromatic amines; such as, for example, 4,4'-methylene-bis-o-chloroaniline ("MbOCA"); 4,4'-methylene-bis-(3-chloro-2,6-diethylaniline) ("MCDEA"); dimethylthiotoluenediamine; trimethyleneglycol di-p-aminobenzoate; polytetramethyleneoxide di-p-aminobenzoate; polytetramethyleneoxide mono-p-aminobenzoate; polypropyleneoxide di-p-aminobenzoate; polypropyleneoxide mono-p-aminobenzoate; 1,2-bis(2-aminophenylthio)ethane;

4,4'-methylene-bis-aniline; diethyltoluenediamine; 5-tert-butyl-2,4-toluendiamine; 3-tert-butyl-2,6-toluenediamine; 5-tert-amyl-2,4-toluenediamine; and 3-tert-amyl-2,6-toluenediamine and chlorotoluenediamine.

In many cases, compounds containing both amino and hydroxyl groups can be useful to provide chemical mechanical polishing pads with unique properties. Preferably, the (P) side amino alcohol is selected from the group consisting amine initiated polyols. More preferably, the (P) side amino alcohol is selected from the group consisting amine initiated polyols containing one to four (still more preferably, two to four; most preferably, two) nitrogen atoms per molecule. Preferably, the (P) side amino alcohol is selected from the group consisting amine initiated polyols that have an average of at least three hydroxyl groups per molecule. More preferably, the (P) side amino alcohol is selected from the group consisting of amine initiated polyols that have an average of three to six (still more preferably, three to five; most preferably, four) hydroxyl groups per molecule. Particularly preferred amine initiated polyols a number average molecular weight, $M_N$, of ≤700 (preferably, of 150 to 650; more preferably, of 200 to 500; most preferably 250 to 300) and have a hydroxyl number (as determined by ASTM Test Method D4274-11) of 350 to 1,200 mg KOH/g. More preferably, the amine initiated polyol used has a hydroxyl number of 400 to 1,000 mg KOH/g (most preferably 600 to 850 mg KOH/g). Examples of commercially available amine initiated polyols include the Voranol® family of amine initiated polyols (available from The Dow Chemical Company); the Quadrol® Specialty Polyols (N,N,N',N'-tetrakis(2-hydroxypropyl ethylene diamine)) (available from BASF); Pluracol® amine based polyols (available from BASF); Multranol® amine based polyols (available from Bayer MaterialScience LLC); triisopropanolamine (TIPA) (available from The Dow Chemical Company); ethanolamine, diethanolamine, diisopropanolamine, and, triethanolamine (TEA) (available from Mallinckrodt Baker Inc.). A number of preferred amine initiated polyols are listed in TABLE 2.

TABLE 2

| Amine initiated polyol | Number of OH groups per molecule | $M_N$ | Hydroxyl Number (mg KOH/g) |
|---|---|---|---|
| Triethanolamine | 3 | 149 | 1130 |
| Triisopropanolamine | 3 | 192 | 877 |
| MULTRANOL ® 9138 Polyol | 3 | 240 | 700 |
| MULTRANOL ® 9170 Polyol | 3 | 481 | 350 |
| VORANOL ® 391 Polyol | 4 | 568 | 391 |
| VORANOL ® 640 Polyol | 4 | 352 | 638 |
| VORANOL ® 800 Polyol | 4 | 280 | 801 |
| QUADROL ® Polyol | 4 | 292 | 770 |
| MULTRANOL ® 4050 Polyol | 4 | 356 | 630 |
| MULTRANOL ® 4063 Polyol | 4 | 488 | 460 |
| MULTRANOL ® 8114 Polyol | 4 | 568 | 395 |
| MULTRANOL ® 8120 Polyol | 4 | 623 | 360 |
| MULTRANOL ® 9181 Polyol | 4 | 291 | 770 |
| VORANOL ® 202 Polyol | 5 | 590 | 475 |

Preferably, in the method of the present invention, the poly side (P) liquid component is introduced into the internal cylindrical chamber (65) through the at least one (P) side liquid feed port (75) at a (P) side charge pressure of 6,895 to 27,600 kPa. More preferably, the poly side (P) liquid component is introduced into the internal cylindrical chamber (65) through the at least one (P) side liquid feed port (75) at a (P) side charge pressure of 8,000 to 20,000 kPa. Most preferably, the poly side (P) liquid component is introduced into the internal cylindrical chamber (65) through the at least one (P) side liquid feed port (75) at a (P) side charge pressure of 10,000 to 17,000 kPa.

Preferably, in the method of the present invention, the iso side (I) liquid component, comprises at least one multi-functional isocyanate. Preferably, the at least one multi-functional isocyanate contains two reactive isocyanate groups (i.e., NCO).

Preferably, the at least one multi-functional isocyanate is selected from the group consisting of an aliphatic multi-functional isocyanate, an aromatic multi-functional isocyanate and a mixture thereof. More preferably, the multi-functional isocyanate is a diisocyanate selected from the group consisting of 2,4-toluene diisocyanate; 2,6-toluene diisocyanate; 4,4'-diphenylmethane diisocyanate; naphthalene-1,5-diisocyanate; tolidine diisocyanate; para-phenylene diisocyanate; xylylene diisocyanate; isophorone diisocyanate; hexamethylene diisocyanate; 4,4'-dicyclohexylmethane diisocyanate; cyclohexanediisocyanate; and, mixtures thereof. Still more preferably, the at least one multi-functional isocyanate is an isocyanate terminated urethane prepolymer formed by the reaction of a diisocyanate with a prepolymer polyol.

Preferably, the at least one multi-functional isocyanate is an isocyanate-terminated urethane prepolymer; wherein the isocyanate-terminated urethane prepolymer has 2 to 12 wt % unreacted isocyanate (NCO) groups. More preferably, the isocyanate-terminated urethane prepolymer used in the method of the present invention has 2 to 10 wt % (still more preferably 4 to 8 wt %; most preferably 5 to 7 wt %) unreacted isocyanate (NCO) groups.

Preferably, the isocyanate terminated urethane prepolymer used is the reaction product of a diisocyanate with a prepolymer polyol; wherein the prepolymer polyol is selected from the group consisting of diols, triols, polyols, polyol diols, copolymers thereof and mixtures thereof. More preferably, the prepolymer polyol is selected from the group consisting of polyether polyols (e.g., poly(oxytetramethylene)glycol, poly(oxypropylene)glycol and mixtures thereof); polycarbonate polyols; polyester polyols; polycaprolactone polyols; mixtures thereof; and, mixtures thereof with one or more low molecular weight polyols selected from the group consisting of ethylene glycol; 1,2-propylene glycol; 1,3-propylene glycol; 1,2-butanediol; 1,3-butanediol; 2-methyl-1,3-propanediol; 1,4-butanediol; neopentyl glycol; 1,5-pentanediol; 3-methyl-1,5-pentanediol; 1,6-hexanediol; diethylene glycol; dipropylene glycol; and, tripropylene glycol. Still more preferably, the prepolymer polyol is selected from the group consisting of polytetramethylene ether glycol (PTMEG); ester based polyols (such as poly(ethylene adipate), poly(butylene adipate) polyols; polypropylene ether glycols (PPG); polyethylene ether glycols, polycaprolactone polyols; copolymers thereof; and, mixtures thereof. Most preferably, the prepolymer polyol is selected from the group consisting of PTMEG and PPG.

Preferably, when the prepolymer polyol is PTMEG, the isocyanate terminated urethane prepolymer has an unreacted isocyanate (NCO) concentration of 2 to 10 wt % (more preferably of 4 to 8 wt %; most preferably 6 to 7 wt %). Examples of commercially available PTMEG based isocyanate terminated urethane prepolymers include Imuthane® prepolymers (available from COIM USA, Inc., such as, PET-80A, PET-85A, PET-90A, PET-93A, PET-95A, PET-60D, PET-70D, PET-75D); Adiprene® prepolymers (available from Chemtura, such as, LF 800A, LF 900A, LF 910A, LF 930A, LF 931A, LF 939A, LF 950A, LF 952A, LF 600D, LF 601D, LF 650D, LF 667, LF 700D, LF750D, LF751D, LF752D, LF753D and L325); Andur® prepolymers (available from Anderson Development Company, such as, 70APLF, 80APLF, 85APLF, 90APLF, 95APLF, 60DPLF, 70APLF, 75APLF).

Preferably, when the prepolymer polyol is PPG, the isocyanate terminated urethane prepolymer has an unreacted isocyanate (NCO) concentration of 3 to 9 wt % (more preferably 4 to 8 wt %, most preferably 5 to 6 wt %). Examples of commercially available PPG based isocyanate terminated urethane prepolymers include Imuthane® prepolymers (available from COIM USA, Inc., such as, PPT-80A, PPT-90A, PPT-95A, PPT-65D, PPT-75D); Adiprene® prepolymers (available from Chemtura, such as, LFG 963A, LFG 964A, LFG 740D); and, Andur® prepolymers (available from Anderson Development Company, such as, 8000APLF, 9500APLF, 6500DPLF, 7501DPLF).

Preferably, the isocyanate terminated urethane prepolymer used in the method of the present invention is a low free isocyanate terminated urethane prepolymer having less than 0.1 wt % free toluene diisocyanate (TDI) monomer content.

Non-TDI based isocyanate terminated urethane prepolymers can also be used in the method of the present invention. For example, isocyanate terminated urethane prepolymers include those formed by the reaction of 4,4'-diphenylmethane diisocyanate (MDI) and polyols such as polytetramethylene glycol (PTMEG) with optional diols such as 1,4-butanediol (BDO) are acceptable. When such isocyanate terminated urethane prepolymers are used, the unreacted isocyanate (NCO) concentration is preferably 4 to 10 wt % (more preferably 4 to 8 wt %, most preferably 5 to 7 wt %). Examples of commercially available isocyanate terminated urethane prepolymers in this category include Imuthane® prepolymers (available from COIM USA, Inc. such as 27-85A, 27-90A, 27-95A); Andur® prepolymers (available from Anderson Development Company, such as, IE75AP, IE80AP, IE 85AP, IE90AP, IE95AP, IE98AP); Vibrathane® prepolymers (available from Chemtura, such as, B625, B635, B821); Isonate® modified prepolymer (available from The Dow Chemical Company, such as, Isonate® 240 with 18.7% NCO, Isonate® 181 with 23% NCO, Isonate® 143L with 29.2% NCO); and, polymeric MDI (available from The Dow Chemical Company, such as, PAPI® 20, 27, 94, 95, 580N, 901).

Preferably, in the method of the present invention, the iso side (I) liquid component is introduced into the internal cylindrical chamber (65) through the at least one (I) side liquid feed port (80) at an (I) side charge pressure of 6,895 to 27,600 kPa. More preferably, the iso side (I) liquid component is introduced into the internal cylindrical chamber (65) through the at least one (I) side liquid feed port (80) at an (I) side charge pressure of 8,000 to 20,000 kPa. Most preferably, the iso side (I) liquid component is introduced into the internal cylindrical chamber (65) through the at least one (I) side liquid feed port (80) at an (I) side charge pressure of 10,000 to 17,000 kPa.

Preferably, in the method of the present invention, at least one of the poly side (P) liquid component and the iso side (I) liquid component can optionally contain additional liquid materials. For example, at least one of the poly side (P) liquid component and the iso side (I) liquid component can contain liquid materials selected from the group consisting of foaming agents (e.g., carbamate foaming agents such as Specflex™ NR 556 $CO_2$/aliphatic amine adduct available from The Dow Chemical Company); catalyst (e.g., tertiary amine catalysts such as Dabco® 33LV catalyst available from Air Products, Inc.); and, surfactants (e.g., Niax siloxane-polyether surfactant from Momentive; and Tegostab® silicone surfactant from Evonik). Preferably, in the method of the present invention, the iso side (I) liquid component contains an additional liquid material. More preferably, in the method of the present invention, the iso side (I) liquid component contains an additional liquid material; wherein the additional liquid material is at least one of a catalyst and a surfactant. Most preferably, in the method of the present invention, the iso side (I) liquid component contains a catalyst and a nonionic surfactant and the poly side (P) liquid contains an ionic surfactant. The nonionic surfactant increases pore size; and it improves pore distribution by seeding pore growth. The ionic surfactant limits pore growth for porosity control. Balancing the nonionic and ionic surfactant levels controls pore size and pore structures in chemical-mechanical polishing pads.

Preferably, the nonionic surfactant is at least one selected from the following polyoxyethylene glycol alkyl ethers, polyoxypropylene glycol alkyl ethers, polyoxyethylene glycol octylphenol ethers; polyoxyethylene glycol alkylphenol ethers; polyoxyethylene glycol sorbitan alkyl esters; block copolymers of polyethylene glycol and polypropylene glycol; glucoside alkyl ethers; glycerol alkyl esters; siloxane-polyether copolymers. Most preferably, the nonionic surfactant is a siloxane-polyether surfactants. Preferably the siloxane-polyether surfactants is Dabco DC192, Dabco DC 193, Dabco DC_2525; Dabco DC 2584; Dabco DC 3042; Dabco DC 5098; Dabco DC 5105; Dabco DC 5987 from Air Product; Tegostab B8155; Tegostab B8245; Tegostab B8239; Tegostab B8244 from Evonik; Niax L-580; Niax L-5345; Niax L-6915; Niax L-6638; Niax L-6895 from Momentive.

The ionic surfactant may be anionic or cationic. Preferable examples of anionic surfactants include at least one selected from the following: sodium lauryl sulfate; dioctyl sodium sulfosuccinate; perfluorooctanesulfonate; perfluorobutanesulfonate and linear alkylbenzene sulfonates. Preferable cationic surfactants include at least on selected from the following: cetyl trimethylammonium bromide; hexadecyl trimethyl ammonium bromide; cetyl trimethylammonium chloride; cetylpyridinium chloride; benzalkonium chloride; benzethonium chloride; dimethyldioctadecylammonium chloride; dioctadecyldimethylammonium bromide Most preferably, the cationic surfactant is Maquat MC 5815; Maquat MC 1416; Maquat MC 1412; Maquat MQ 624M; Maquat PQ 230, and Maquat® SL-5 from Pilot Chemical.

The method applies droplets of a liquid polymer against a substrate to form a plurality of pores in the liquid polymer. The liquid polymer contains a nonionic surfactant having a concentration sufficient to facilitate growth of pores within the liquid polymer. Most preferably, connecting adjacent pores to form a network of interconnected pores in the liquid polymer. Preferably, the nonionic surfactant has a concentration of 0.01 to 10 weight percent. Most preferably, the nonionic surfactant has a concentration of 0.05 to 5 weight percent. The ionic surfactant has a concentration sufficient to limit growth of the pores within the liquid polymer. Preferably, the ionic surfactant has a concentration of 0.01 to 10 weight percent. Most preferably, the ionic surfactant has a concentration of 0.05 to 5 weight percent. Most preferably the ionic surfactant is cationic.

The droplets of liquid polymer solidify against the surface into a solid substrate containing a plurality of pores. Preferably, the droplets strike a mold to form a groove pattern in the polishing pad. Then repeating the applying of droplets and the solidifying of the droplets of liquid polymer multiple times builds multiple layers to increase the thickness of a porous solid polymer. Then curing the porous solid polymer forms a polishing pad with the final size of the plurality of pores controlled by the concentrations of nonionic surfactant and ionic surfactant. Preferably, the polishing pad has a density of 0.3 to 0.9 g/cm$^3$. Most preferably, the polishing pad has a density of 0.3 to 0.7 g/cm$^3$.

Preferably the process includes the additional step of reducing the amount of cationic surfactant to increase pore size to apply and form a subpad directly on the polishing pad. Then curing the polishing pad and the subpad in a simultaneous step forms the final product. Preferably, the pad and the subpad include the same polymer, but different pore volumes.

Preferably, in the method of the present invention, the pressurized gas used is selected from the group consisting of carbon dioxide, nitrogen, air and argon. More preferably, the pressurized gas used is selected from the group consisting of carbon dioxide, nitrogen and air. Still more preferably, the pressurized gas used is selected from the group consisting of nitrogen and air. Most preferably, the pressurized gas used is air.

Preferably, in the method of the present invention, the pressurized gas used has a water content of ≤10 ppm. More preferably, the pressurized gas used has a water content of ≤1 ppm. Still more preferably, the pressurized gas used has a water content of ≤0.1 ppm. Most preferably, the pressurized gas used has a water content of ≤0.01 ppm.

Preferably, in the method of the present invention, the pressurized gas is introduced into the internal cylindrical chamber (65) though the at least two tangential pressurized gas feed ports (85) with an inlet velocity, wherein the inlet velocity is 90 to 600 m/s calculated based on ideal gas conditions at 20° C. and 1 atm pressure. Without wishing to be bound by theory, it is noted that when the inlet velocity is too low, the polishing layer deposited in the mold has an increased likelihood of developing undesirable cracks.

Preferably, in the method of the present invention, the pressurized gas is introduced into the internal cylindrical chamber (65) through the at least two tangential pressurized gas feed ports (85) with a supply pressure of 150 to 1,500 kPa. More preferably, the pressurized gas is introduced into the internal cylindrical chamber (65) through the at least two tangential pressurized gas feed ports (85) with a supply pressure of 350 to 1,000 kPa. Most preferably, the pressurized gas is introduced into the internal cylindrical chamber (65) through the at least two tangential pressurized gas feed ports (85) with a supply pressure of 550 to 830 kPa.

Preferably, the method of forming a chemical mechanical polishing pad polishing layer of the present invention, comprises: providing a poly side (P) liquid component and an iso side (I) liquid component; wherein the poly side (P) liquid component and the iso side (I) liquid component are provided at a stoichiometric ratio of the reactive hydrogen groups (i.e., the sum of the amine (NH$_2$) groups and the hydroxyl (OH) groups) in the components of the poly side (P) liquid component to the unreacted isocyanate (NCO) groups in the iso side (I) liquid component of 0.85 to 1.15 (more preferably 0.90 to 1.10; most preferably 0.95 to 1.05).

Preferably, in the method of the present invention, the combined mass flow rate of the poly side (P) liquid component and the iso side (I) liquid component to the internal cylindrical chamber (65) is 6 to 500 g/s (preferably, 6 to 250 g/s; more preferably, 6 to 100 g/s; most preferably, 6 to 25 g/s).

Preferably, in the method of the present invention, the combination formed in the axial mixing device (60) is discharged from the open end (68) of the internal cylindrical chamber (65) toward the base (12) of the mold (10) at a velocity of 10 to 300 m/sec. More preferably, the combination is discharged from the opening (69) at the open end (68) of the axial mixing device (60) with a velocity having a z-component in a direction parallel to the z axis (Z) toward the base (12) of the mold (10) of 10 to 300 m/sec.

Preferably, in the method of the present invention, the combination is discharged from the open end (68) of the axial mixing device (60) at a distance, D, along the z dimension from the bottom surface (92) of the chemical mechanical polishing pad polishing layer (90) formed in the mold (10). More preferably, the combination is discharged from the open end (68) of the axial mixing device (60) at a distance, D, along the z dimension from the bottom surface (92) of the chemical mechanical polishing pad polishing layer (90) formed in the mold (10); wherein the average distance, $D_{avg}$, is 2.5 to 125 cm (more preferably, 7.5 to 75 cm; most preferably, 12.5 to 50 cm).

Preferably, in the method of the present invention, the combination formed in the axial mixing device has a gel time of 5 to 900 seconds. More preferably, the combination formed in the axial mixing device has a gel time of 10 to 600 seconds. Most preferably, the combination formed in the axial mixing device has a gel time of 15 to 120 seconds.

Preferably, the chemical mechanical polishing pad polishing layer prepared using the method of the present invention can be interfaced with at least one additional layer to form a chemical mechanical polishing pad. Preferably, the chemical mechanical polishing pad polishing layer prepared using the method of the present invention is interfaced with a compressible subpad (not shown); wherein the compressible subpad is interfaced with the polishing layer (90) using a stack adhesive; wherein the stack adhesive is interposed between the bottom surface (92) of the polishing layer (90) and the compressible subpad. The subpad preferably improves conformance of the polishing layer to the surface of the substrate being polished. Preferably, the stack adhesive used is an adhesive selected from the group consisting of pressure sensitive adhesives, reactive hot melt adhesives, contact adhesives and combinations thereof. More preferably, the stack adhesive used is selected from the group consisting of reactive hot melt adhesives and pressure sensitive adhesives. Most preferably, the stack adhesive used is a reactive hot melt adhesive.

Preferably, the chemical mechanical polishing pad polishing layer prepared using the method of the present invention is incorporated into a chemical mechanical polishing pad, wherein the chemical mechanical polishing pad is adapted to be interfaced with the platen of a polishing machine. Preferably, the chemical mechanical polishing pad is adapted to be interfaced with the platen using at least one of a vacuum and a pressure sensitive platen adhesive.

Preferably, the chemical mechanical polishing pad polishing layer prepared using the method of the present invention is adapted for polishing a substrate; wherein the substrate is at least one of a magnetic substrate, an optical substrate and a semiconductor substrate. More preferably, the chemical mechanical polishing pad polishing layer prepared using the method of the present invention is adapted for polishing a substrate; wherein the substrate is a semiconductor substrate. Most preferably, the chemical mechanical polishing pad polishing layer prepared using the method of the present invention is adapted for polishing a substrate; wherein the substrate is a semiconductor wafer.

Preferably, in the method of the present invention, the chemical mechanical polishing pad polishing layer derived from the cake has a polishing surface with a groove pattern (100) formed into the polishing surface (95). Preferably, the groove pattern comprises one or more grooves arranged on the polishing surface such that upon rotation of the chemical mechanical polishing pad polishing layer during polishing, the one or more grooves sweep over the surface of the substrate being polished. Preferably, the one or more grooves consist of curved grooves, linear grooves and combinations thereof.

Preferably, the groove pattern comprises a plurality of grooves. More preferably, the groove pattern is selected from a groove design. Preferably, the groove design is selected from the group consisting of concentric grooves (which may be circular or spiral), radial grooves, curved grooves, cross hatch grooves (e.g., arranged as an X-Y grid across the pad surface), other regular designs (e.g., hexagons, triangles), tire tread type patterns, irregular designs (e.g., fractal patterns), and combinations thereof. More preferably, the groove design is selected from the group consisting of random grooves, concentric grooves, radial grooves, spiral grooves, cross-hatched grooves, X-Y grid grooves, hexagonal grooves, triangular grooves, fractal grooves and combinations thereof. Most preferably, the polishing surface has a combination radial plus circular groove pattern formed therein. The groove profile is preferably selected from rectangular with straight side walls or the groove cross section may be "V" shaped, "U" shaped, saw-tooth, and combinations thereof.

Figure 6:
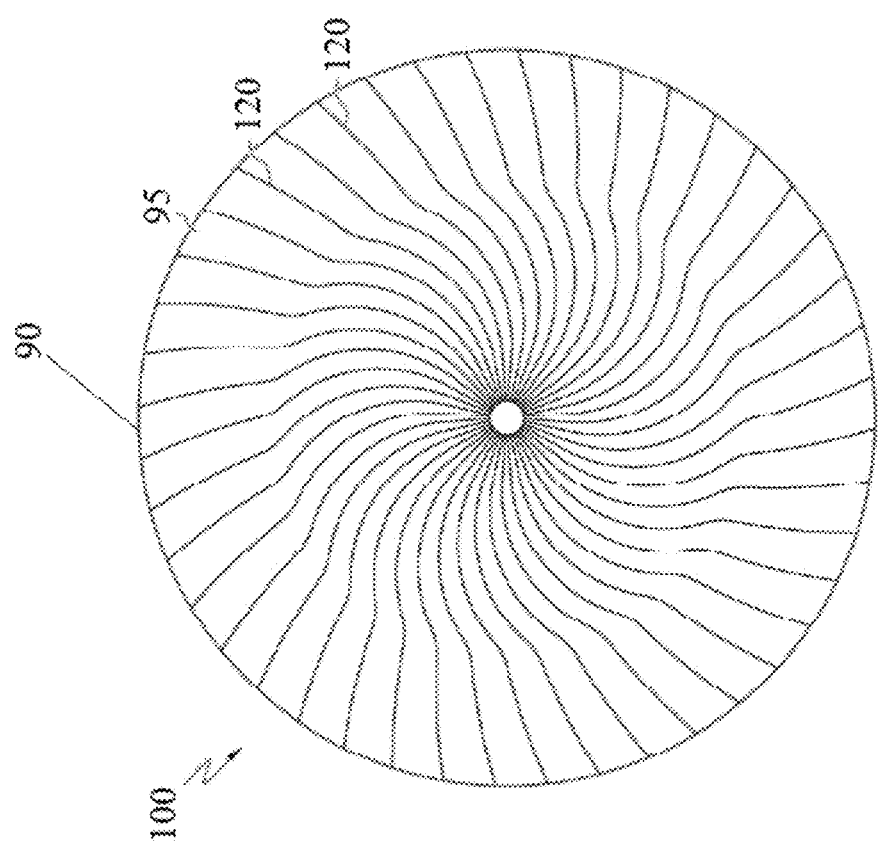
FIG. 6 is a depiction of a top plan view of a groove pattern formed in the polishing surface of a chemical mechanical polishing pad polishing layer.

Preferably, the groove pattern (100) comprises a plurality of grooves formed in the polishing surface (95) of a chemical mechanical polishing pad polishing layer (90), wherein the plurality of grooves are curved grooves (120). (See FIG. 6).

Figure 7:
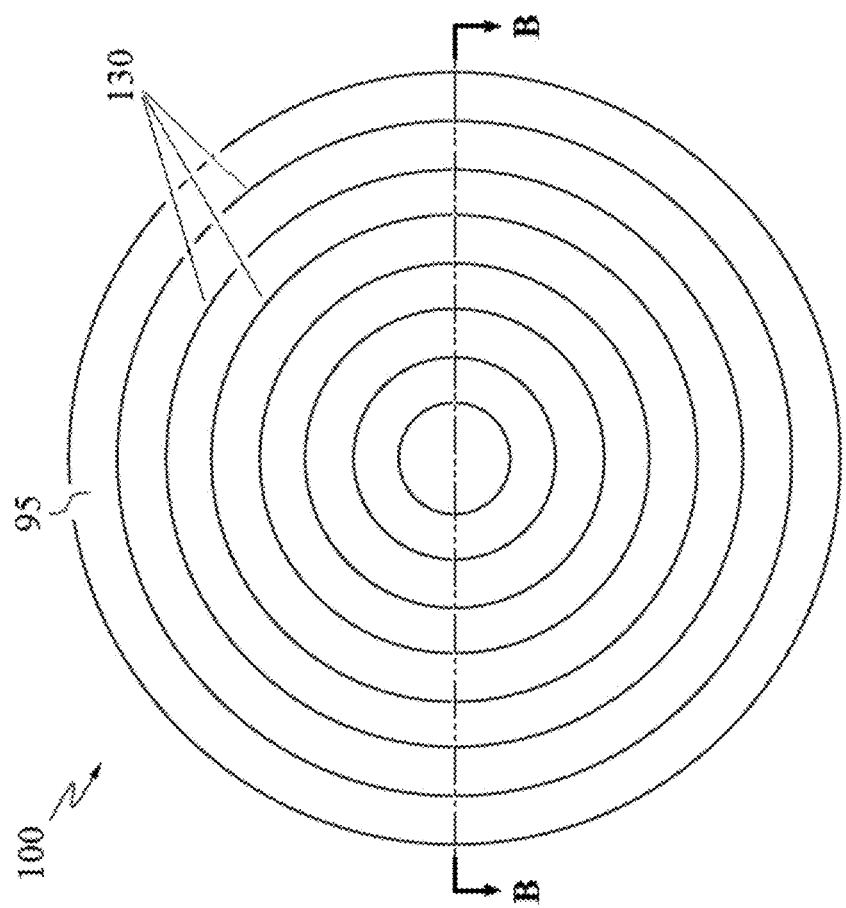
FIG. 7 is a depiction of a top plan view of a groove pattern formed in the polishing surface of a chemical mechanical polishing pad polishing layer.
Figure 8:
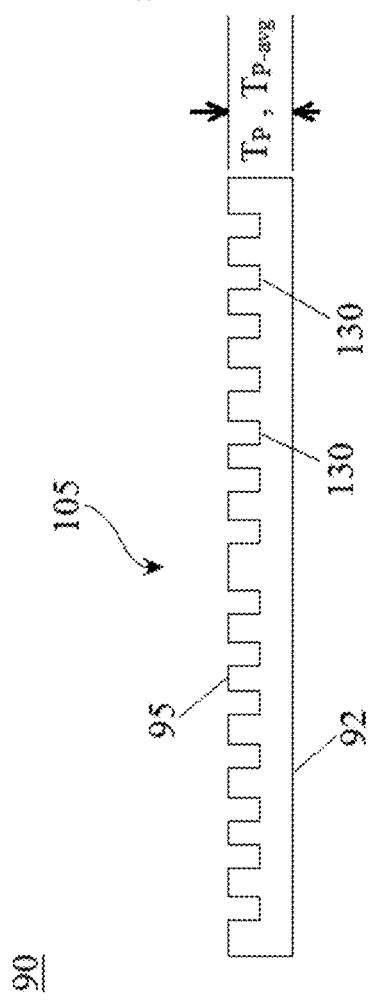
FIG. 8 is a cross section view taken along line C-C in FIG. 7.

Preferably, the groove pattern (100) comprises a plurality of grooves formed in the polishing surface (95) of a chemical mechanical polishing pad polishing layer (90), wherein the plurality of grooves are concentric circular grooves (130). (See FIGS. 7-8).

Figure 9:
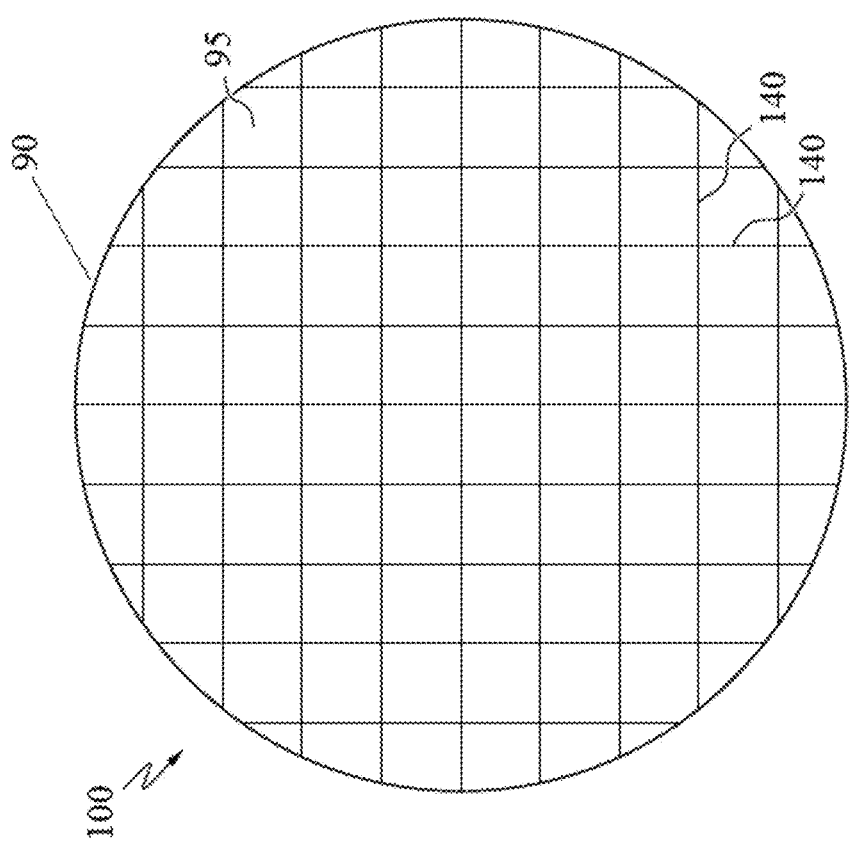
FIG. 9 is a depiction of a top plan view of a groove pattern formed in the polishing surface of a chemical mechanical polishing pad polishing layer.

Preferably, the groove pattern (100) comprises a plurality of grooves formed in the polishing surface (95) of a chemical mechanical polishing pad polishing layer (90), wherein the plurality of grooves are linear X-Y grooves (140). (See FIG. 9).

Figure 10:
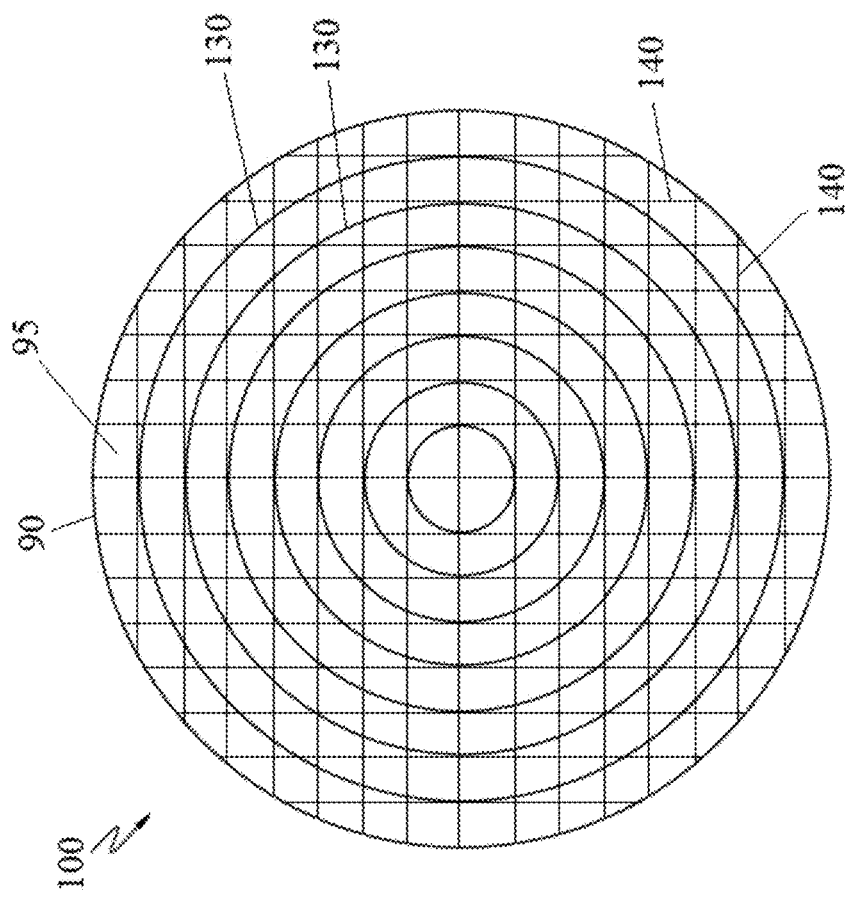
FIG. 10 is a depiction of a top plan view of a groove pattern formed in the polishing surface of a chemical mechanical polishing pad polishing layer.

Preferably, the groove pattern (100) comprises a plurality of grooves formed in the polishing surface (95) of a chemical mechanical polishing pad layer (90), wherein the plurality of grooves comprise concentric circular grooves (130) and linear X-Y grooves (140). (See FIG. 10).

Preferably, the chemical mechanical polishing pad polishing layer (90) prepared using the method of the present invention has an average thickness, $T_{P\text{-}avg}$, of 20 to 150 mils. More preferably the chemical mechanical polishing pad polishing layer (90) prepared using the method of the present invention has an average thickness, $T_{P\text{-}avg}$, of 30 to 125 mils (still more preferably 40 to 120 mils; most preferably 50 to 100 mils). (See FIG. 5).

EXAMPLES

Example 1 (High Concentration of Cationic Surfactant)

In a two-component process line, tank A (iso side) contained 98.04 parts by weight of isocyanate Isonate™ 181 methylenediphenyl diiosocyanate (MDI) prepolymer (45 to 55 wt % methylenediphenyl diiosocyanate, dipropyleneglycol, tripropyleneglycol, copolymer and 45 to 55 wt % 4,4'-methylenediphenyl diiosocyanate isomer). In addition, tank A contained a balance of 1.96 parts by weight of surfactant Niax L5345 nonionic silicone surfactant. The surfactant contained a copolymer of polyalkyleneoxidemethylsiloxane copolymer; and the copolymer had 30 to 50 wt % polyalkylene oxide and 0.1 to 1 wt % octamethylcyclotetrasiloxane. The materials were agitated and heated to 120° F. (48.9° C.).

In tank B (poly side), 13.95 parts by weight of Ethacure 300 amine curative (80 wt % 4-methyl-2,6-bis(methylthio)-1,3-benzenediamine and 20 wt % 2-methyl-4,6-bis(methylthio)-1,3-benzenediamine) was mixed with 81.77 parts by weight of PolyTHF 650 (number average molecular weight 650) polyether (≥99.5 wt %). In addition, tank B contained 1.95 parts by weight of surfactant Dabco 5103 (siloxated polyether-ethoxylated graft polymer of 35 wt % siloxane and 65 wt % ethylene oxide with a hydroxyl end cap); 1.95 parts by weight of cationic surfactant Maquat SL-5 (Poly (oxy-1,2-ethanediyl) α, α'-[(9Z, 12Z)-(2,3-dihydroxypropyl)-9,12-octadecadien-1-yliminojdi-2, 1-ethanediyl]bis[ω-hydroxy-], chloride 38-42 wt % and balance water) and 0.39 parts by weight of catalyst Dabco 33LV (Dipropylene glycol 67 wt % and triethylenediamine (TEDA) 33 wt %).

Figure 12:
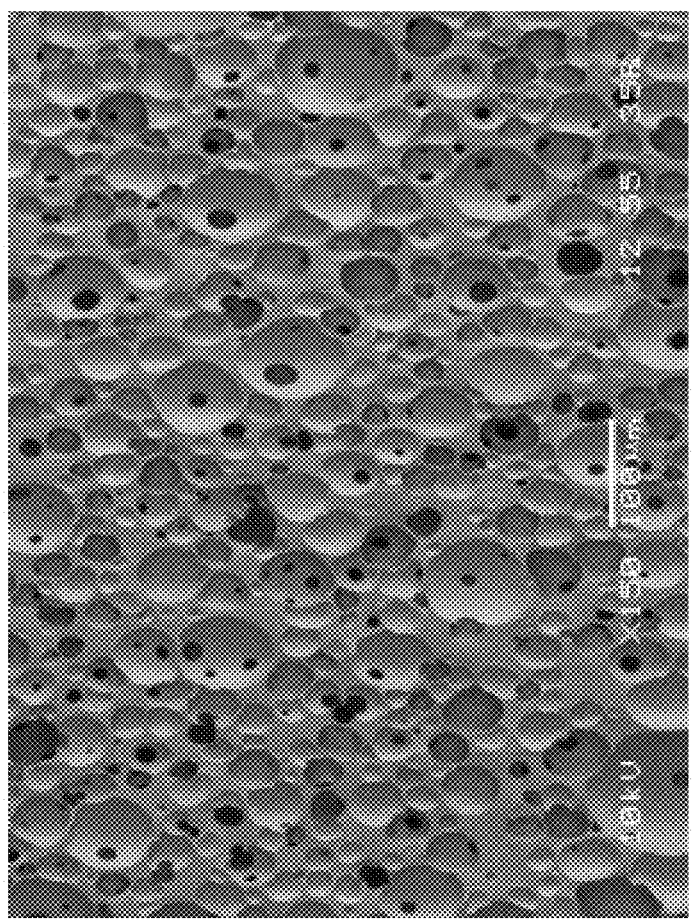
FIG. 12 is an SEM cross-sectional view of a polishing pad formed with a combination of nonionic and cationic surfactants of the invention.

The materials were agitated and heated to 120° F. (48.9° C.). The flow out rate ratio from tank A over tank B was 0.99. The air pressure for the liquid polymer was 110 psi (758 kPa). The sheet from the process was cured at room temperature for 2 minutes, then cured at 100° C. for 16 hours. The obtained pads had density 0.48 g/cm³ and a Shore D hardness of 36.5. Referring to FIG. 12, SEM images showed there were lots of inter-connected pores and closed pores. The pores had a uniform distribution, with the majority of these pores having an oval shape.

Example 2 (Low Concentration of Cationic Surfactant)

In a two-component process line, tank A (iso side) contained 98.04 parts by weight of isocyanate Isonate™ 181 methylenediphenyl diiosocyanate (MDI) prepolymer (45 to 55 wt % methylenediphenyl diiosocyanate, dipropyleneglycol, tripropyleneglycol, copolymer and 45 to 55 wt % 4,4'-methylenediphenyl diiosocyanate isomer). In addition, tank A contained a balance of 1.96 parts by weight of surfactant Niax L5345 nonionic silicone surfactant. The surfactant contained a copolymer of polyalkyleneoxidemethylsiloxane copolymer; and the copolymer had 30 to 50 wt % polyalkylene oxide and 0.1 to 1 wt % octamethylcyclotetrasiloxane. The materials were agitated and heated to 120° F. (48.9° C.).

In tank B (poly side), 16.43 parts by weight of Ethacure 300 amine curative (80 wt % 4-methyl-2,6-bis(methylthio)-1,3-benzenediamine and 20 wt % 2-methyl-4,6-bis(methylthio)-1,3-benzenediamine) was mixed with 80.78 parts by weight of PolyTHF 650 polyether (≥99.5 wt %). In addition, tank B contained a balance of 1.95 parts by weight of surfactant Dabco 5103 (siloxated polyether-ethoxylated graft polymer of 35 wt % siloxane and 65 wt % ethylene oxide with a hydroxyl end cap); 0.48 parts by weight of cationic surfactant Maquat SL-5 (Poly(oxy-1,2-ethanediyl) α, α'-[(9Z, 12Z)-(2,3-dihydroxypropyl)-9,12-octadecadien-1-yliminojdi-2, 1-ethanediyl]bis[ω-hydroxy-], chloride 38-42 wt % and balance water) and 0.37 parts by weight of catalyst Dabco 33LV (Dipropylene glycol 67 wt % and triethylenediamine (TEDA) 33 wt %).

Figure 13:
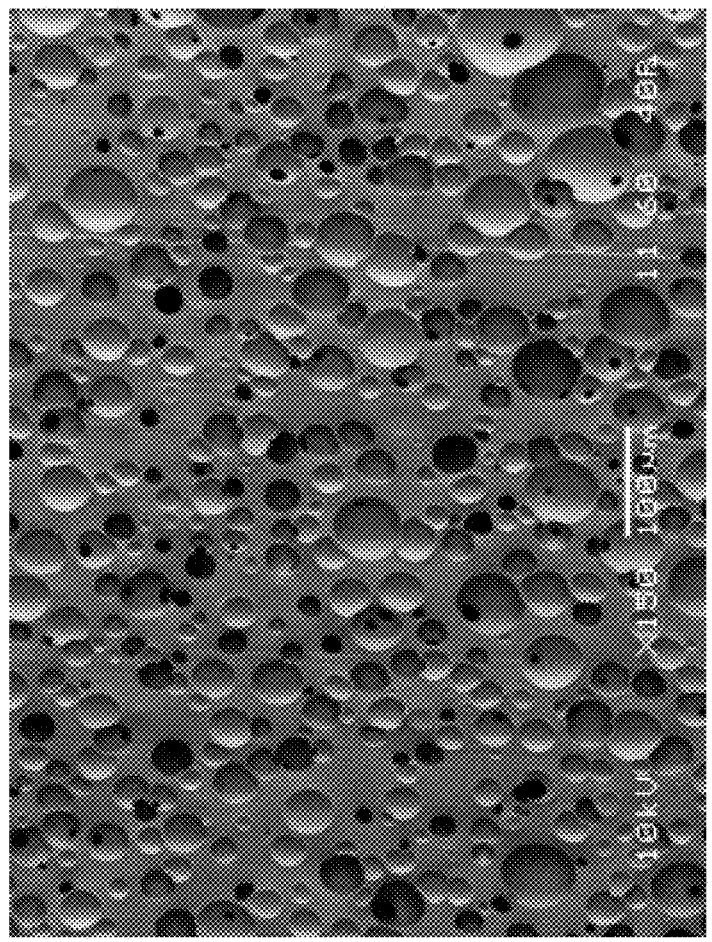
FIG. 13 is an SEM cross-sectional view of a polishing pad formed with a combination of nonionic and cationic surfactants of the invention.

The materials were agitated and heated to 120° F. (48.9° C.). The flow out rate ratio by volume from tank A over tank B was 0.84. The air pressure for the liquid polymer was 110 psi (758 kPa). The sheet from the process was cured at room temperature for 2 minutes, then cured at 100° C. for 16 hours. The cured pads had a density 0.70 g/cm³ and a Shore D hardness of 22.3. Referring to FIG. 13, the SEM images showed that there were several interconnected pores and closed pores. The pores had a uniform distribution, with the majority of these pores having an oval shape.

Example 3 (No Cationic Surfactant)

In a two-component process line, tank A (iso side) contained 98.04 parts by weight of isocyanate Isonate 181 methylenediphenyl diisocyanate (MDI) prepolymer (45 to 55 wt % methylenediphenyl diisocyanate, dipropyleneglycol, tripropyleneglycol, copolymer and 45 to 55 wt % 4,4'-methylenediphenyl diisocyanate isomer). In addition, tank A contained a balance of 1.96 parts by weight of surfactant Niax L5345 nonionic silicone surfactant. The surfactant contained a copolymer of polyalkyleneoxidemethylsiloxane; and the copolymer had 30 to 50 wt % polyalkylene oxide and 0.1 to 1 wt % octamethylcyclotetrasiloxane. The materials were agitated and heated to 120° F. (48.9° C.).

In tank B (poly side), 10.19 parts by weight of Ethacure 300 amine curative (80 wt % 4-methyl-2,6-bis(methylthio)-1,3-benzenediamine and 20 wt % 2-methyl-4,6-bis(methylthio)-1,3-benzenediamine) was mixed with 87.05 parts by weight of PolyTHF 650 polyether (≥99.5 wt %); 1.95 parts by weight of surfactant Dabco 5103 (siloxated polyether-ethoxylated graft polymer of 35 wt % siloxane and 65 wt % ethylene oxide with a hydroxyl end cap). In addition, tank B contained 1.95 parts by weight of surfactant Dabco 5103 (siloxated polyether-ethoxylated graft polymer of 35 wt % siloxane and 65 wt % ethylene oxide with a hydroxyl end cap) with a balance of 0.46 parts by weight of deionized water and 0.35 parts by weight of catalyst Dabco 33LV (Dipropylene glycol 67 wt % and triethylenediamine (TEDA) 33 wt %).

Figure 14:
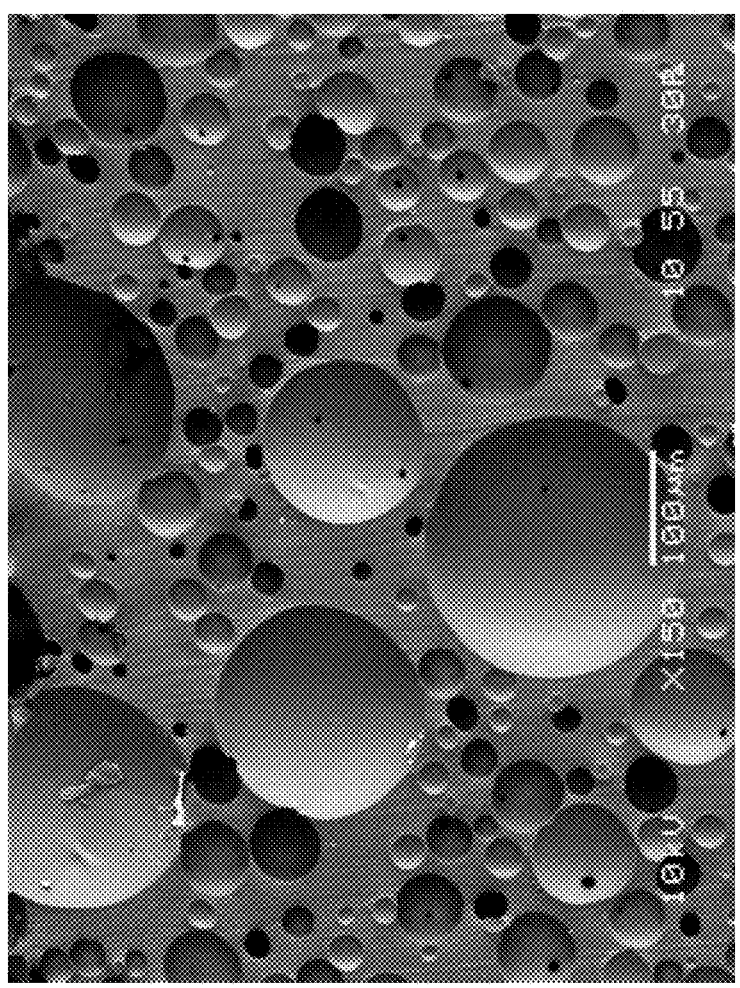
FIG. 14 is an SEM cross-sectional view of a polishing pad formed with a nonionic surfactant.

The materials were agitated and heated to 120° F. (48.9° C.). The flow out rate ratio by volume from tank A over tank B was 0.79. The air pressure for the liquid polymer was 110 psi (758 kPa). The sheet from the process was cured at room temperature for 2 minutes, then cured at 100° C. for 16 hours. The cured pads had a density 0.71 g/cm³; Shore D hardness of 16.8. Referring to FIG. 14, SEM images showed most pores had a round shape, but pore size distribution was larger than that of Examples 1 and 2 with a non-uniform size distribution.

Example 4 (High Concentration of Cationic Surfactant and TDI Prepolymer)

In a two-component process line, tank A (iso side) contained 98.04 parts of isocyanate prepolymer LF 750 D urethane prepolymer from Chemtura (a prepolymer blend of toluene diisocyanate (TDI) and polytetramethylene ether glycol (PTMEG) with a wt % NCO of 8.75-9.05 wt %). In addition, tank A contained a balance of 1.96 parts by weight of surfactant Niax L5345 nonionic silicone surfactant. The surfactant contained a copolymer of polyalkyleneoxidemethylsiloxane; and the copolymer had 30 to 50 wt % polyalkylene oxide and 0.1 to 1 wt % octamethylcyclotetrasiloxane. The materials were agitated and heated to 135° F. (57.2° C.).

Figure 15:
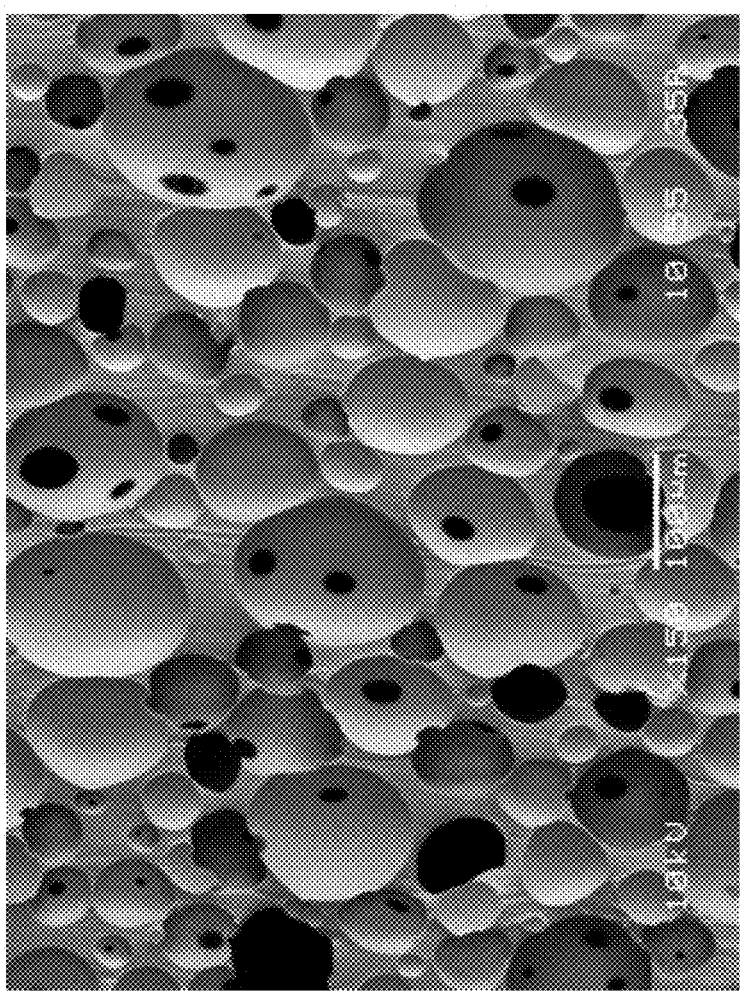
FIG. 15 is an SEM cross-sectional view of a polishing pad formed with a combination of nonionic and cationic surfactants of the invention.

In tank B (poly side), 86.72 part of Ethacure 300 amine curative (80 wt % 4-methyl-2,6-bis(methylthio)-1,3-benzenediamine and 20 wt % 2-methyl-4,6-bis(methylthio)-1,3-benzenediamine) was mixed with 1.95 parts by weight of surfactant Dabco 5103 (siloxated polyether-ethoxylated graft polymer of 35 wt % siloxane and 65 wt % ethylene oxide with a hydroxyl end cap) and 11.03 parts by weight of cationic surfactant Maquat SL-5 (Poly(oxy-1,2-ethanediyl) α, α'-[(9Z, 12Z)-(2,3-dihydroxypropyl)-9,12-octadecadien-1-yliminojdi-2, 1-ethanediyl]bis[ω-hydroxy-], chloride 38-42 wt % and balance water) and 0.30 parts by weight of catalyst Dabco 33LV (Dipropylene glycol 67 wt % and triethylenediamine (TEDA) 33 wt %). The materials were agitated and heated to 75° F. (23.9° C.). The flow out rate ratio by volume from tank A over tank B was 8.88. The air pressure for was 110 psi (758 kPa). The sheet from the process was cured at room temperature for 10 minutes, then cured at 100° C. for 16 hours. The cured pads had a density of 0.43 g/cm³ and a Shore D hardness of 17.5. Referring to FIG. 15, SEM images showed most pores had an oval shape with a uniform distribution.

The invention is efficacious for forming porous polishing pads for chemical mechanical planarization applications. In particular, adjustment of nonionic surfactant concentration in combination with ionic surfactants concentration can fine tune pore size. In addition, it is possible to further adjust surfactant concentrations to form a subpad having a contiguous solid polymeric structure with a different pore size. This change in pore size allows the entire pad to deflect to accommodate a wafer and allows adjustment to reduce edge effect.

We claim:

1. A method of manufacturing a polishing pad suitable for planarizing at least one of semiconductor, optical and magnetic substrates, the method comprising the following:
   a. applying droplets of a liquid polymer into a mold—to form a plurality of pores in the liquid polymer, the liquid polymer containing a nonionic surfactant, the nonionic surfactant having a concentration sufficient to facilitate growth of pores within the liquid polymer and a cationic surfactant having a concentration sufficient to limit growth of the pores within the liquid polymer;
   b. solidifying the droplets of liquid polymer against the substrate into a solid polymer containing a plurality of pores;
   c. repeating the applying of droplets and the solidifying of the droplets of liquid polymer multiple times to increase thickness of the porous solid polymer; and
   d. reducing the amount of cationic surfactant to increase pore size and form a subpad; and
   e. curing the solid polymer into the polishing pad with the subpad with a final size of the plurality of pores controlled by the concentration of nonionic surfactant and cationic surfactant.

2. The method of claim 1 wherein the droplets strike the mold to form a groove pattern in the polishing pad.

3. The method of claim 1 wherein the nonionic surfactant is a silicone surfactant.

4. The method of claim 1 wherein the curing forms the polishing pad with a density of 0.3 to 0.9 g/cm³.

5. A method of manufacturing a polishing pad suitable for planarizing at least one of semiconductor, optical and magnetic substrates, the method comprising the following:
   a. applying droplets of a liquid polymer into a mold to form a plurality of pores in the liquid polymer, the liquid polymer containing a nonionic surfactant, the nonionic surfactant having a concentration sufficient to facilitate growth of pores within the liquid polymer and a cationic surfactant having a concentration sufficient to limit growth of the pores within the liquid polymer;

b. connecting adjacent pores to form a network of interconnected pores in the liquid polymer;
c. solidifying the droplets of liquid polymer against the substrate into a solid polymer containing a plurality of pores;
d. repeating the applying of droplets, connecting adjacent pores and the solidifying of the droplets of liquid polymer multiple times to increase thickness of the porous solid polymer;
e. reducing the amount of cationic surfactant to increase pore size and form a subpad; and
f. curing the solid polymer into a polishing pad with final size of the plurality of pores controlled by the concentration of nonionic surfactant and ionic surfactant.

6. The method of claim 5 wherein the droplets strike the mold to form a groove pattern in the polishing pad.

7. The method of claim 5 wherein the nonionic surfactant is a silicone surfactant.

8. The method of claim 5 wherein the curing forms the polishing pad with a density of 0.3 to 0.7 $g/cm^3$.

* * * * *